United States Patent
Bieringer et al.

(10) Patent No.: US 9,360,091 B2
(45) Date of Patent: Jun. 7, 2016

(54) ON-LOAD TAP CHANGER WITH WORM GEAR

(75) Inventors: Alfred Bieringer, Geiselhoering (DE); Daniel Lassleben, Painten (DE); Mario Schmeckebier, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 271 days.

(21) Appl. No.: 14/233,687

(22) PCT Filed: Aug. 9, 2012

(86) PCT No.: PCT/EP2012/065597
§ 371 (c)(1),
(2), (4) Date: Feb. 7, 2014

(87) PCT Pub. No.: WO2013/029955
PCT Pub. Date: Mar. 7, 2013

(65) Prior Publication Data
US 2014/0182402 A1     Jul. 3, 2014

(30) Foreign Application Priority Data
Sep. 2, 2011   (DE) .................. 10 2011 112 365

(51) Int. Cl.
| H01H 19/00 | (2006.01) |
| H01H 21/00 | (2006.01) |
| F16H 19/02 | (2006.01) |
| H01H 9/00  | (2006.01) |

(52) U.S. Cl.
CPC ............. *F16H 19/02* (2013.01); *H01H 9/0033* (2013.01); *H01H 2009/0061* (2013.01); *Y10T 74/18792* (2015.01)

(58) Field of Classification Search
CPC ................ F16H 19/02; H01H 9/0033; H01H 2009/0061; H01H 9/0005; Y10T 74/18792; H02K 11/0042; H02K 7/1166; H02K 7/1004
USPC .................................................... 200/11 TC
See application file for complete search history.

(56) References Cited

U.S. PATENT DOCUMENTS

| 6,124,726 A | 9/2000 | Dohnal |
| 7,622,688 B2 * | 11/2009 | Baertl ................. H01H 9/0027 200/17 R |
| 2011/0033317 A1 | 2/2011 | Greven |
| 2012/0169350 A1 | 7/2012 | Bieringer |
| 2014/0167573 A1 * | 6/2014 | Bieringer ............. H01H 9/0033 310/68 B |

FOREIGN PATENT DOCUMENTS

| DE | 19546215 B | 4/1997 |
| DE | 10315204 A | 10/2004 |

* cited by examiner

*Primary Examiner* — Renee Luebke
*Assistant Examiner* — Lheiren Mae A Caroc
(74) *Attorney, Agent, or Firm* — Andrew Wilford

(57) ABSTRACT

The invention relates to a worm gear which is arranged directly on the head of an on-load tap changer and has a housing, a worm, and a worm wheel, wherein means for torque detection comprising at least one radio-scannable surface wave sensor, a rotor antenna and a stator antenna are provided in the interior of the worm gear.

4 Claims, 1 Drawing Sheet

Fig. 1 - Prior Art
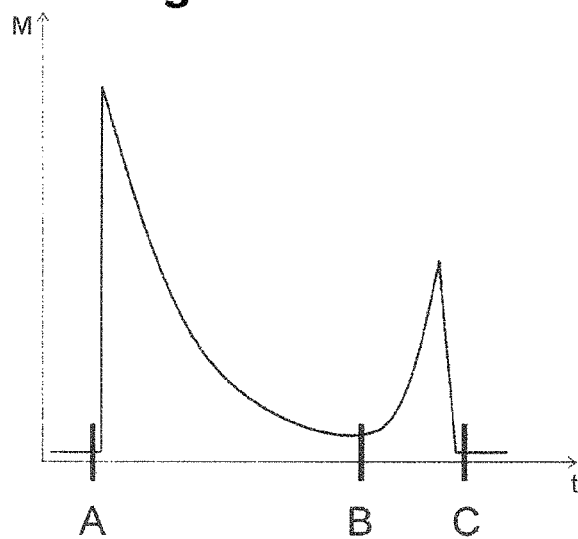
Fig. 2
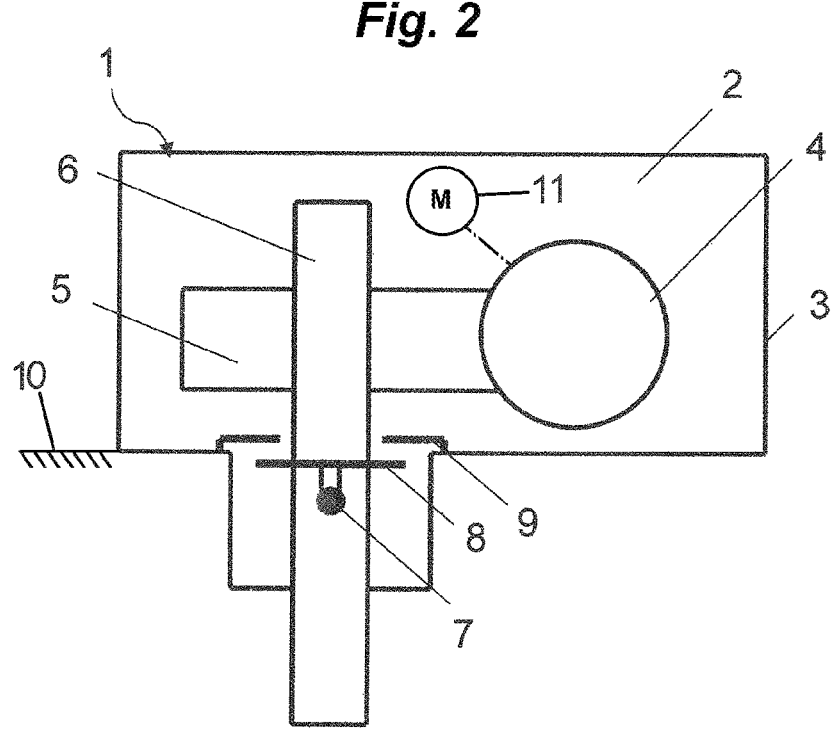

001# ON-LOAD TAP CHANGER WITH WORM GEAR

CROSS REFERENCE TO RELATED APPLICATIONS

This application is the US-national stage of PCT application PCT/EP2012/065597 filed 9 Aug. 2012 and claiming the priority of German patent application 102011112365.6 itself filed 2 Sep. 2011.

FIELD OF THE INVENTION

The invention relates to a tap changer with a worm transmission arranged at a tap changer head and is used with the help of a drive for switching over the tap changer, with means for torque detection.

BACKGROUND OF THE INVENTION

It is already known from published specification DE 19744465 [U.S. Pat. No. 6,124,726] that there is a very substantial interest in monitoring tap changers during the entire period of a load changeover so as to thereby be able to ensure correct functioning. This is usually realized by detection of the torque plot, positional detection of the respective instantaneous setting of the tap changer and comparison of the ascertained value pairs with previously stored values. The torque plot is in that case ascertained in each load changeover with the help of the effective values of current and voltage by way of the effective power of the drive.

Usually an electric motor drives the tap changer by way of a load transmission, a bevel-gear transmission and a worm transmission. These transmissions are connected together by shafts and have different translation ratios and levels of efficiency. The two factors can influence the measurements of torque. In the case of a belt transmission, for example, slipping of the belt can occur at high temperatures, as a result of which efficiency is reduced. Even low temperatures have a significant influence on the torque plot. FIG. 1 shows a simplified plot of a first switching process at −20° Celsius. Time t is recorded on the illustrated abscissa and the ordinate depicts torque M. The time instant A here characterizes the start of the switching process. As can be clearly seen, torque initially rises very strongly. The reasons for that are, inter alia, the belt, which has low-temperature toughness, in the load transmission and the viscous lubricant in the worm and bevel-gear transmissions. After overcoming these first resistances the plot of the torque reduces until the time instant B. The second rise, between the time instants B and C, is correlated with actuation of the energy store. Just prior to release this needs more energy in order to stress the springs. At the time instant C the switching process has ended. Whereas the second rise caused by the energy store, is characteristic for the torque plot of a changeover, the first rise—between the time instants A and B—is always temperature-dependent and thus non-constant and not calculable.

It is disadvantageous with the prior art that the three transmissions also influence measurement error. These are determined by the products of the individual efficiencies and translation ratios and can in part be very substantial. This applies particularly to the first switching processes after a longer period of standstill of the entire drive train.

OBJECT OF THE INVENTION

The object of the invention is to provide, in a tap changer, a torque detection which is as precise as possible, functions reliably and takes into consideration temperature influence so as to thereby eliminate the factors that influence measurement error of the entire drive.

SUMMARY OF THE INVENTION

The object is fulfilled by a tap changer with a worm transmission, wherein in accordance with the invention the worm transmission comprises means for torque detection, in which means for torque detection are provided in the worm transmission and consist of at least one surface-wave sensor that can be interrogated by radio a rotor antenna and a stator antenna, the at least one surface-wave sensor interrogatable by radio is fastened on the shaft, the rotor antenna is conductively connected with the at least one surface-wave sensor and interrogatable by radio and is fastened to the shaft and the stator antenna axially spaced from the rotor antenna is fixed at the lower housing part directly or by a mount.

The invention is based on the general idea of arranging the torque detection closer to the tap changer so as to in that case completely exclude the factors of drive and transmission.

BRIEF DESCRIPTION OF THE DRAWING

The invention will be explained in the following by way of figures, in which:

FIG. 1 shows a torque plot known from the prior art, of a switching process at −20° C. and FIG. 2 shows a worm transmission according to the invention of a tap changer with means for torque detection.

SPECIFIC DESCRIPTION OF THE INVENTION

A worm transmission 1 consisting of an upper housing part 2 formed as a cover, and a lower housing part 3 is illustrated in FIG. 2. Disposed in the interior is, inter alia, a helically formed worm 4. This is driven by way of—here not illustrated—drive trains and transmissions by a motor drive. The worm 4 is mechanically connected with a worm wheel 5 by mechanically positive coupling and drives this. The worm wheel 5 is in turn connected with a shaft 6 that directly or indirectly drives a tap changer and the parts thereof such as, for example, selector, energy store, etc.

At least one surface-wave sensor 7 (SAW sensor) that can be interrogated by radio is mounted on the shaft 6. The radio-interrogatable surface-wave sensor 7 is conductively connected with a rotor antenna 8. This is of radial construction and is mechanically connected with the shaft 6. An axially spaced, disc-shaped stator antenna 9 of radial construction is arranged relative to the rotary antenna 8. The stator antenna 9 is firmly fixed in the lower housing part 3 directly or by way of a mount. The energy and data transmission is carried out electromagnetically by way of the rotor antenna 8 and the stator antenna 9.

It is particularly advantageous that the torque detection is carried out after the worm 4 and the worm wheel 5, thus at the output of the worm transmission. The efficiency and translation of all transmissions installed upstream thus have no influence on the measurement; measurement errors are minimal. Moreover, tolerances changing with time as well as wear of the mechanically loaded parts of the transmission are not taken into consideration in the evaluations of the measurements. A further substantial advantage is that the contactless energy and data transmission needs almost no maintenance by comparison with wiping contacts or direct connections.

In addition, the radio-interrogatable surface-wave sensor 7 is in a position of measuring the temperature of the shaft 6. In that case the possibility is created of correcting the measured values of the torque plot by the factors determined by temperature.

The invention claimed is:

1. A tap changer with a worm transmission, wherein
the worm transmission is arranged directly at the head of the tap changer,
the worm transmission has an upper housing part and a lower housing part,
the worm transmission comprises a worm driven by a motor,
the worm is mechanically connected with a worm wheel,
the worm wheel is connected with a shaft such that the worm drives the shaft via the worm wheel,
the shaft drives the tap changer,
means for torque detection are provided in the worm transmission and consist of at least one surface-wave sensor that can be interrogated by radio, a rotor antenna, and a stator antenna,
the at least one surface-wave sensor interrogatable by radio is fastened on the shaft,
the rotor antenna conductively connected with the at least one surface-wave sensor interrogatable by radio is fastened to the shaft, and
the stator antenna axially spaced from the rotor antenna is fixed at the lower housing part directly or by a mount.

2. The tap changer according to claim 1, wherein the energy and data transmission takes place electromagnetically by the rotor antenna and the stator antenna in such a way that it can be contactlessly coupled into the at least one surface-wave sensor interrogatable by radio.

3. The tap changer according claim 1, wherein the at least one surface-wave sensor interrogatable by radio additionally detects temperature.

4. In a tap changer having
a stator having a head,
a worm transmission mounted directly on the head of the tap changer and having
an upper housing part,
a lower housing part,
a motor,
a worm driven by the motor mechanically connected to the motor,
a worm gear meshing with the worm, and
a rotor shaft rotatable in the housing, carrying the worm gear, and connected with the tap changer such that the worm rotates the shaft with the worm gear and thereby drives the tap changer,
a torque detector comprising:
a surface-wave sensor interrogatable by radio and mounted on the shaft for rotation therewith,
a rotor antenna also mounted on the shaft for rotation therewith and electrically connected to the surface-wave sensor, and
a stator antenna fixed on the lower housing part axially spaced from rotor antenna.

* * * * *